United States Patent
Huang (10) Patent No.: US 7,831,093 B2
(45) Date of Patent: Nov. 9, 2010

(54) METHOD FOR CALCULATING AND ADJUSTING PHOTO AND TEXT SEPARATION PERFORMANCE

(75) Inventor: Chun-Chia Huang, Taipei (TW)

(73) Assignee: Primax Electronics Ltd., Taipei (TW)

( * ) Notice: Subject to any disclaimer, the term of this patent is extended or adjusted under 35 U.S.C. 154(b) by 967 days.

(21) Appl. No.: 11/624,047

(22) Filed: Jan. 17, 2007

(65) Prior Publication Data

US 2008/0095438 A1    Apr. 24, 2008

(30) Foreign Application Priority Data

Oct. 20, 2006  (TW) .............................. 95138657 A (51) Int. Cl.
*G06K 9/34* (2006.01)
(52) U.S. Cl. .................. 382/176; 382/118; 382/181
(58) Field of Classification Search .................. 382/176, 382/181, 118, 187, 188; 715/210, 209; 358/1.9
See application file for complete search history.

(56) References Cited

U.S. PATENT DOCUMENTS

| | | | | |
|---|---|---|---|---|
| 5,546,474 A | * | 8/1996 | Zuniga ........................ 382/176 |
| 5,717,940 A | * | 2/1998 | Peairs ........................ 715/209 |
| 5,751,854 A | * | 5/1998 | Saitoh et al. ................ 382/218 |
| 6,134,565 A | * | 10/2000 | Hommersom et al. ....... 715/210 |
| 7,280,249 B2 | * | 10/2007 | Ohta ........................... 358/1.9 |

* cited by examiner

*Primary Examiner*—Samir A. Ahmed
*Assistant Examiner*—Ruiping Li
(74) *Attorney, Agent, or Firm*—Apex Juris, pllc; Tracy M Heims (57) ABSTRACT

This invention relates to a method for calculating and adjusting photo and text separation performance. The method for calculating photo and text separation performance comprises a step of generating a standard block attribute file and a step of comparing a photo and text separation result with the standard block attribute file so as to display a photo and text separation performance table. The method for adjusting photo and text separation performance comprises a step of comparing a photo and text separation result with the standard block attribute file to generate the photo and text separation performance table, and a step of according to the photo and text separation performance table to decide whether to use another photo and text separation algorithm or parameters to perform another photo and text separation.

7 Claims, 6 Drawing Sheets

METHOD FOR CALCULATING AND ADJUSTING PHOTO AND TEXT SEPARATION PERFORMANCE

FIELD OF THE INVENTION

The present invention relates to a method for calculating and adjusting photo and text separation performance associated with the printing functions of multifunction peripherals, and more particularly to a method for calculating and adjusting photo and text separation performance so as to display the correct ratio of the photo and text separation result.

BACKGROUND OF THE INVENTION

A multifunction peripheral having multiple functions in one structural unit, for example the functions of a printer and a scanner, is employed to achieve various purposes. During operations, an original document is scanned by the scanning module of the multifunction peripheral, and the pixel data of the scanned document are stored in a buffer. The pixel data are then outputted from the buffer to some image processing modules. After a series of image processing operations are performed on the pixel data by the image processing modules, the processed image data are stored into the printer buffer and then printed. Examples of the image processing modules include color space conversion (CSC) modules, color photo/text separation (color PTS) modules, color background removal (color BGR) modules, color filtering modules, color management modules (CMMs) and halftoning processing modules.

In these image processing operations, the photo/text separation is very important because the processing result of the photo and text separation may influence the subsequent color background removal operation, the color filtering operation, the color management and the halftoning processing operation.

In order to achieve excellent photo and text separation performance, the researchers are focused on finding out proper photo and text separation algorithm and parameters. There are several photo and text separation algorithmic methods. The parameters used in each photo and text separation algorithm are diverse. For achieving optimized photo and ext separation performance, the researchers should try many photo and text separation algorithmic methods while changing different parameters. Unfortunately, since no suitable tools are provided for evaluating the photo and text separation result, the photo and text separation performance fails to be largely enhanced. In other words, the photo and text separation result should be manually evaluated. After the photo and text separation result is printed on a paper, the erroneous photo and text separation blocks are marked with the naked eyes. For example, a photo block which is identified as a text block is referred as an erroneous photo and text separation block.

Since the blocks of each image to be examined are abundant and very tiny, the visual identification is time-consuming and always results in fatigue of the examiners' eyes. In addition, since no objective tools are provided, different photo and text separation results are obtained from different examiners. Accordingly, it is important to develop a criterion for determining the photo and text separation result by calculating the photo and text separation performance.

SUMMARY OF THE INVENTION

It is an object of the present invention to provide a method for calculating photo and text separation performance so as to evaluate the photo and text separation performance.

It is another object of the present invention to provide a method for adjusting photo and text separation performance so as to promptly determine optimized photo/text separation algorithm and photo/text separation parameters.

In accordance with an aspect of the present invention, there is provided a method for calculating photo and text separation performance to evaluate the performance of a photo and text separation result by performing a photo and text separation on an original image using a photo and text separation algorithm. The method includes the steps of (A) generating a standard block attribute file, and (B) comparing the photo and text separation result with the standard block attribute file so as to display a photo and text separation performance table. The step of generating the standard block attribute file includes the sub-steps of (A1) displaying the original image on a monitor; (A2) performing the photo and text separation on the original image by using the photo and text separation algorithm, thereby outputting a photo and text separation result; (A3) dividing the photo and text separation result into a plurality of blocks, and marking each block as a text block, a photo block or a border block according to the attribute thereof; (A4) changing the attributes of some blocks; and (A5) generating the standard block attribute file.

In an embodiment, the blocks are marked by different colors depending on the attributes thereof.

In an embodiment, the photo and text separation performance table includes data associated with text block identification performance, picture block identification performance, border block identification performance and correct ratio.

In an embodiment, the data associated with text block identification performance include the numbers of correctly identified text blocks and erroneously identified text blocks. The data associated with photo block identification performance include the numbers of correctly identified photo blocks and erroneously identified photo blocks. The data associated with border block identification performance include the numbers of correctly identified border blocks and erroneously identified border blocks.

In accordance with another aspect of the present invention, there is provided a method for adjusting photo and text separation performance. The method includes steps of (A) performing a photo and text separation on an original image by using a photo and text separation algorithm and a photo and text separation parameter, thereby hereby outputting a first photo and text separation result; (B) comparing the first photo and text separation result with the standard block attribute file, thereby generating a photo and text separation performance table; and (C) discriminating whether another photo and text separation algorithm or parameters are used to perform another photo and text separation is performed on the original image according to the photo and text separation performance table.

In an embodiment, the step of generating the standard block attribute file includes the sub-steps of displaying the original image; performing the photo and text separation on the original image by using the photo and text separation algorithm, thereby outputting a photo and text separation result; dividing the photo and text separation result into a plurality of blocks, and marking each block as a text block, a photo block or a border block according to the attribute thereof; changing the attributes of some blocks; and generating the standard block attribute file.

In an embodiment, the blocks are marked by different colors depending on the attributes thereof.

In an embodiment, the photo and text separation performance table includes data associated with text block identification performance, picture block identification performance, border block identification performance and correct ratio.

In an embodiment, the data associated with text block identification performance include the numbers of correctly identified text blocks and erroneously identified text blocks. The data associated with photo block identification performance include the numbers of correctly identified photo blocks and erroneously identified photo blocks. The data associated with border block identification performance include the numbers of correctly identified border blocks and erroneously identified border blocks.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention relates to a method for calculating photo and text separation performance by executing a program in a computer. Hereinafter, an embodiment of a method for calculating photo and text separation performance will be illustrated with reference to the output images shown in FIGS. 1~4. This method principally comprises the steps: (A) generating a standard block attribute file, and (B) comparing a photo and text separation result with the standard block attribute file so as to display a photo and text separation performance table.

The step (A) of generating a standard block attribute file will be described as follows.

Figure 1:
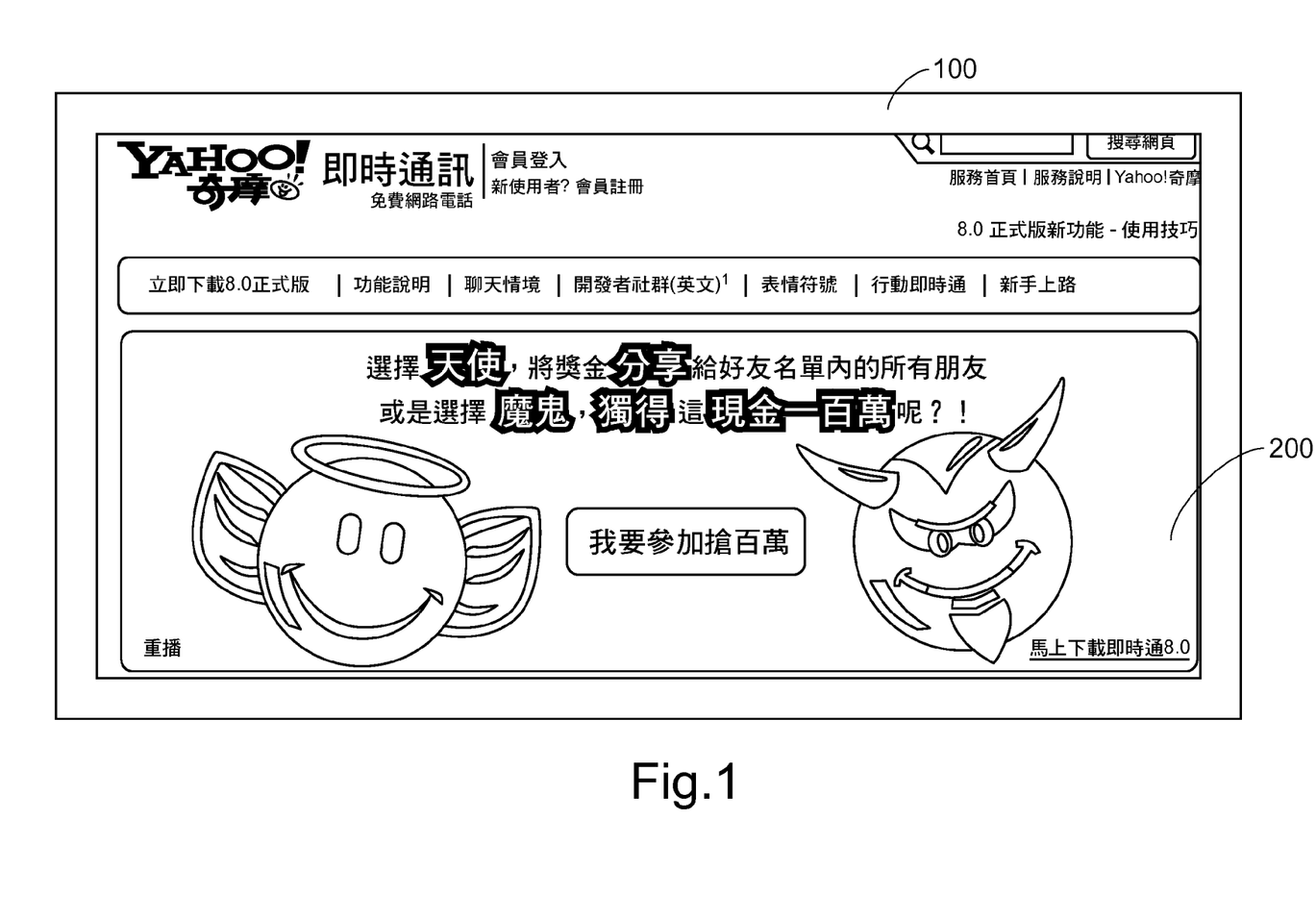
FIG. 1 schematically illustrates an original image shown on the monitor.

First of all, as shown in FIG. 1, an original image 200 is shown on the monitor 100. The original image 200 is ready for performing a photo and text separation.

Figure 2:
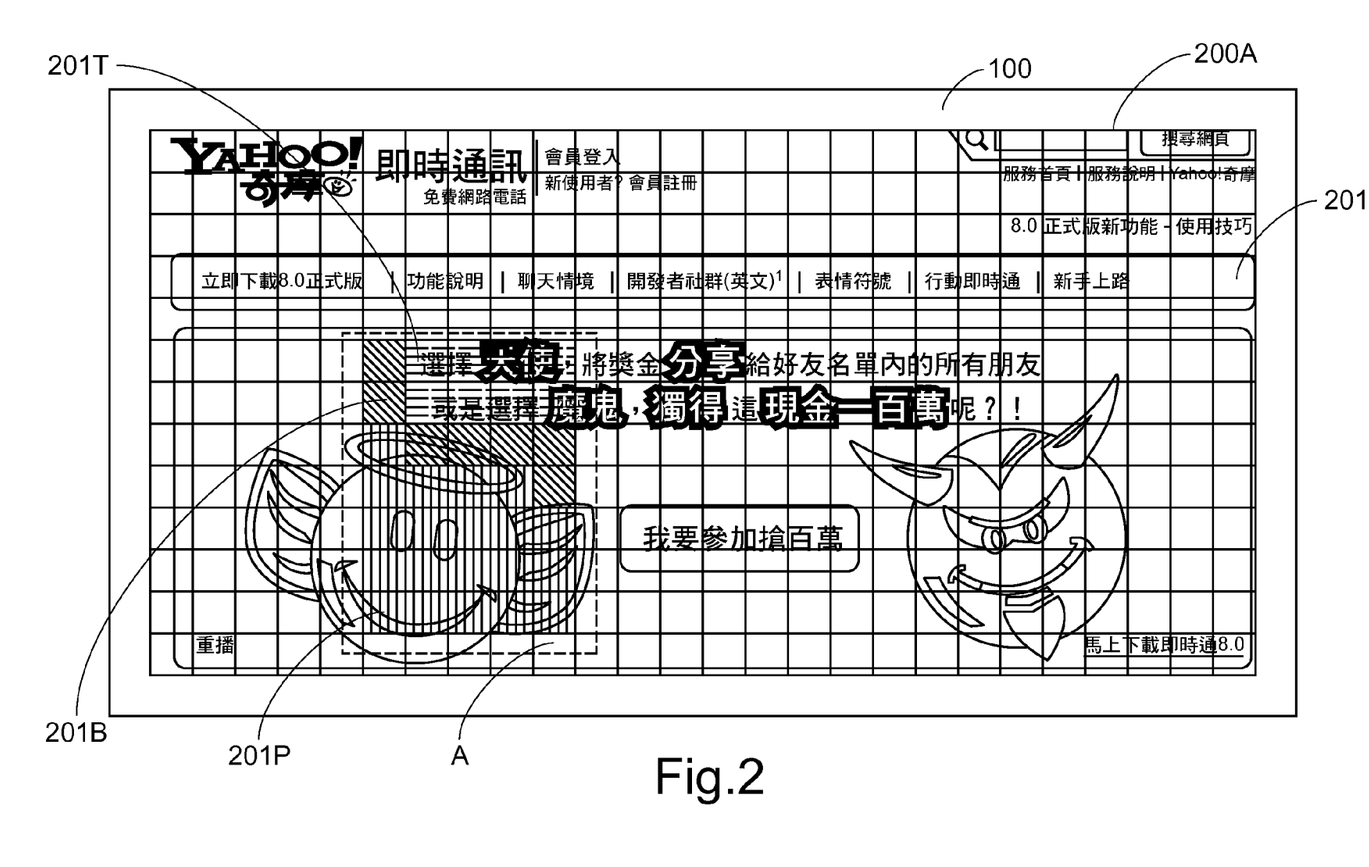
FIG. 2 schematically illustrates the image processed by a photo and text separation, in which the processed image is divided into a plurality of blocks with different attributes.

Subsequently, by using a preset photo and text separation algorithm and preset photo and text separation parameters, a photo and text separation is performed on the original image, thereby displaying the processed image 200A on the monitor 100, as can be seen in FIG. 2. As is also shown in FIG. 2, the processed image 200A is divided into a plurality of identical blocks 201. According to the attributes, these blocks 201 are classified as text blocks 201T, photo blocks 201P and border blocks 201B. In addition, the blocks of different attributes may be marked by different colors. For example, the text blocks 201T, the photo blocks 201P and the border blocks 201B are indicated as red, black and blue blocks, respectively.

It is noted that, however, all blocks 201 are marked by respective attribute symbols. For simplification and clarification, only the blocks including the region A are illustrated, and the blocks with different colors are denoted by different streak patterns. In the region A, the photo blocks 201P are denoted by vertical streaks and identified as the photo blocks according to the preset photo and text separation algorithm and the preset photo and text separation parameters. The text blocks 201T are denoted by horizontal streaks. The border blocks 201B are denoted by oblique streaks. In other words, the sub-image contained in the photo block 201P is a picture, the sub-image contained in the text block 201T is a text, and the sub-image contained in the border block 201B includes both the picture and the text.

Figure 3:
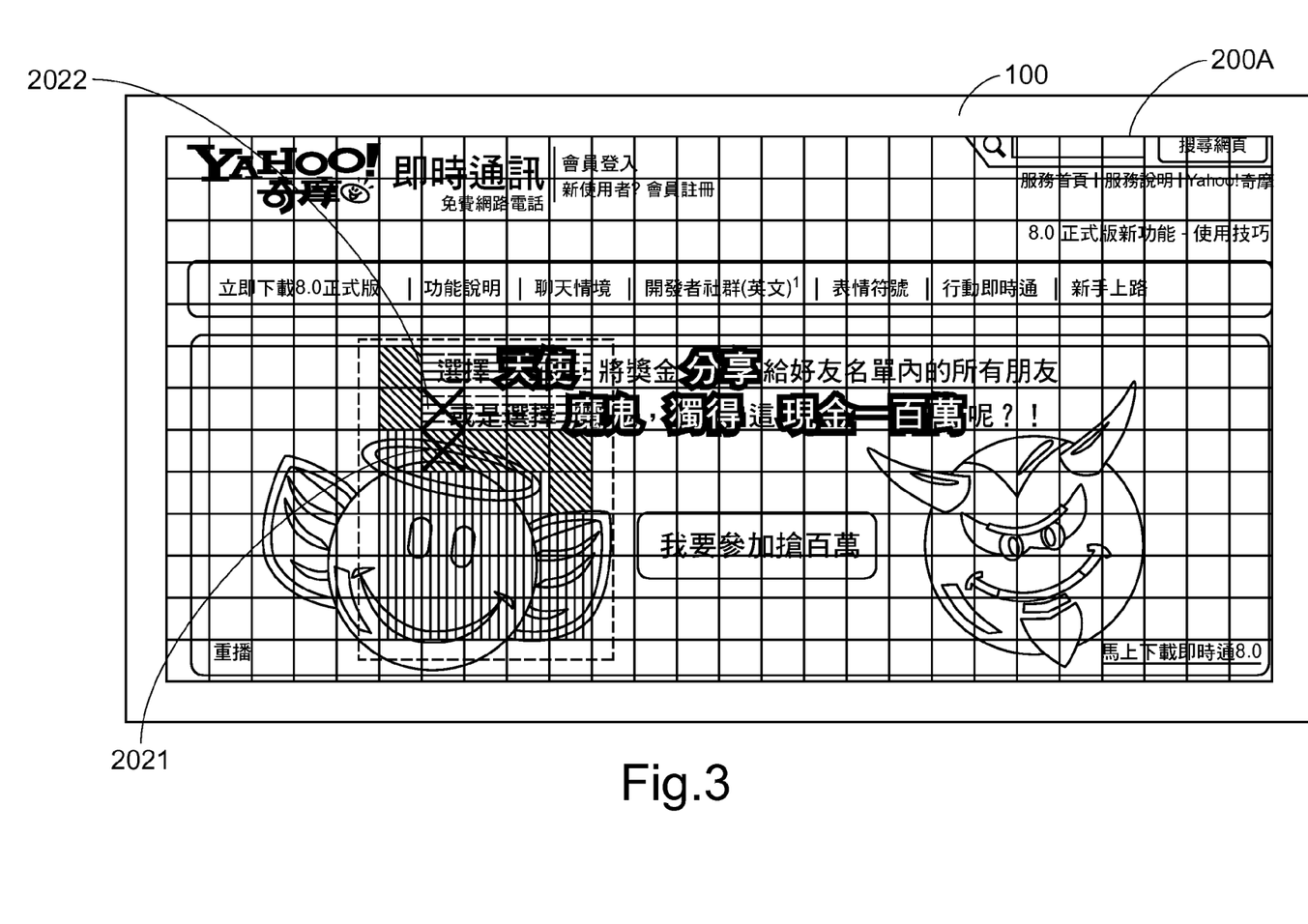
FIG. 3 schematically illustrates the image of FIG. 2, in which the attributes of some blocks are changed by the examiner.
Figure 4:
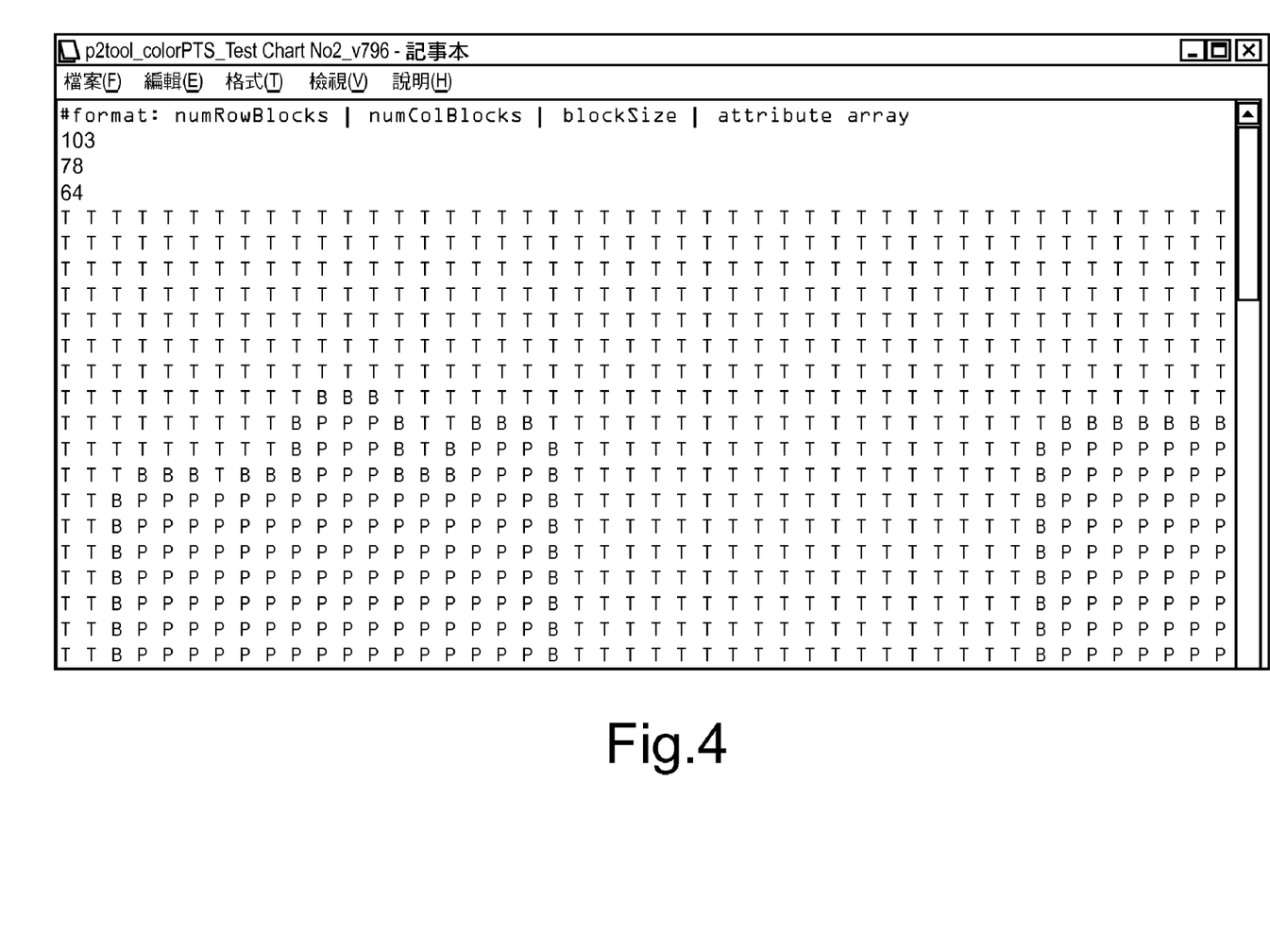
FIG. 4 schematically illustrates the contents of a standard block attribute file according to an embodiment of the present invention.

The attributes of some blocks, however, may be recognized as inappropriate attributes. For example, as shown in FIG. 3, if the block 2021 indicated as oblique streaks (i.e. the border block) is suitably recognized as a photo block, the examiner may mark an "X" symbol on the block 2021. In some embodiments, the color of the "X" symbol is determined according to the above criterion. For example, in a case that any block is changed to the photo block, a black "X" symbol is marked on the block. In another case that any block is changed to the text block, a red "X" symbol is marked on the block. In another case that any block is changed to the border block, a blue "X" symbol is marked on the block. On the other hand, since about one-third of the block 2022 is a text portion but there is no picture included in the remainder, the block 2022 may be identified as a border block. That is, a blue "X" symbol may be marked on the block 2022. It is noted that, however, the attributes of the blocks required to be changed are determined according to the users' requirements. Under this circumstance, the changed attributes of the blocks are more close to the practical image.

Subsequently, in response to a specified command, the blocks with changed attributes and the blocks with unchanged attributes are stored as a standard block attribute file. For example, the standard block attribute file has an extension name of '.txt'. Please refer to FIG. 4, which schematically illustrates the contents of a standard block attribute file according to an embodiment of the present invention. The standard block attribute file is a text file (.txt'), in which "P" denotes a photo block, "T" denotes a text block and "B" denotes a border block.

The step (B) of comparing a photo and text separation result with the standard block attribute file will be described as follows.

Figure 5:
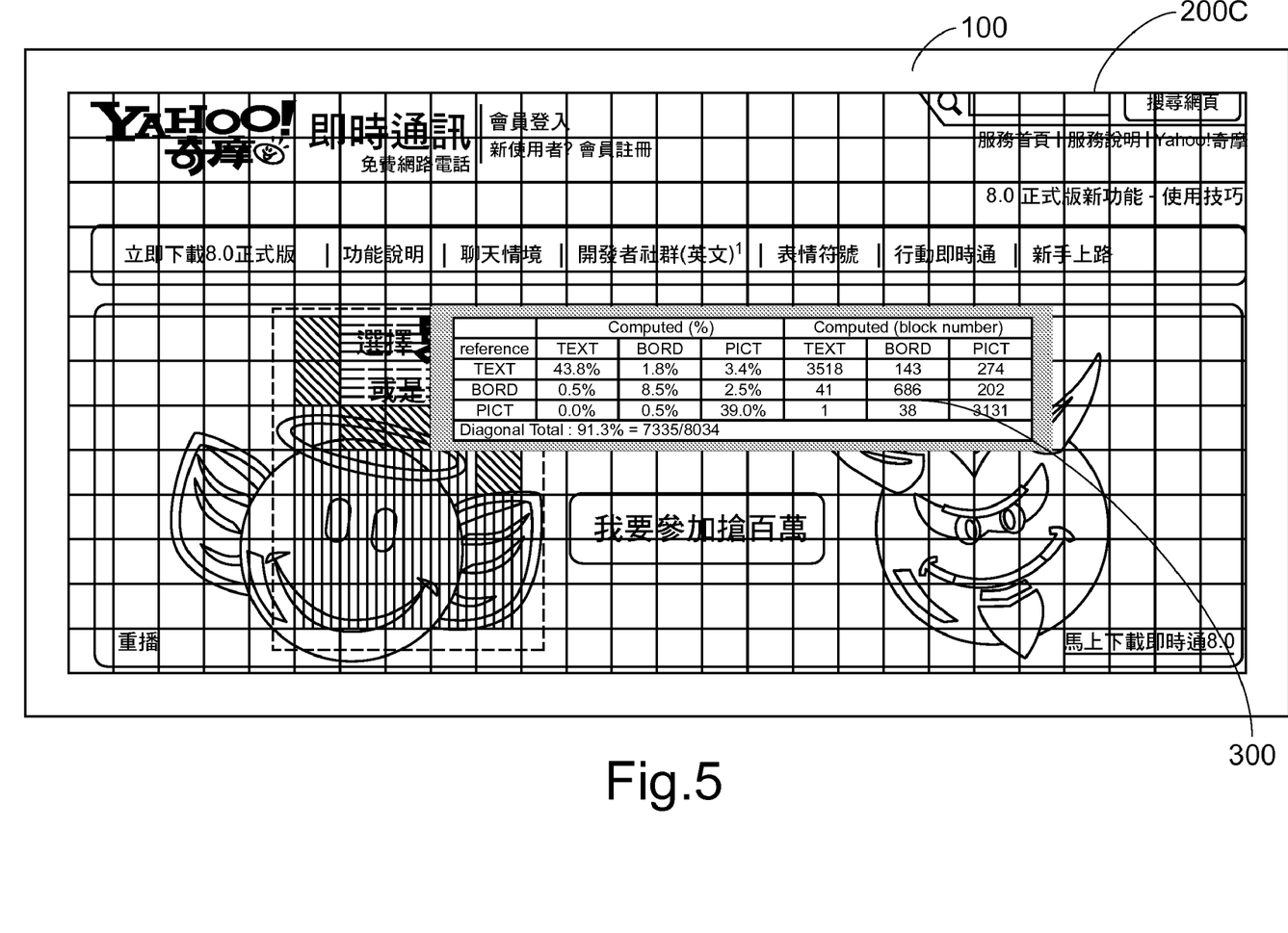
FIG. 5 schematically illustrates a photo and text separation result and a photo and text separation performance table by using a selected photo/text separation algorithm and selected photo/text separation parameters.

Please refer to FIG. 5. By using a selected photo and text separation algorithm and selected photo and text separation parameters, the original image 200 is processed to output a photo and text separation result, i.e. the processed image 200C. Next, in response to another command, a program installed in the computer is executed to compare the photo and text separation result with the standard block attribute file, thereby obtaining a photo and text separation performance table 300. A photo and text separation performance table 300 is shown as follows.

|  | Computed (%) | | | Computed (block number) | | |
|---|---|---|---|---|---|---|
| Reference | TEXT | BORD | PICT | TEXT | BORD | PICT |
| TEXT | 43.8% | 1.8% | 3.4% | 3518 | 143 | 274 |
| BORD | 0.5% | 8.5% | 2.5% | 41 | 686 | 202 |
| PICT | 0.0% | 0.5% | 39.0% | 1 | 38 | 3131 |

Diagonal Total: 91.3% = 7335/8034

In the table, the first column ("Reference") denotes the determining results of the standard block attribute file. The second column ("Computed (%)") denotes the block percentage of the photo and text separation result. The third column (Computed (block number)) denotes the block number of the photo and text separation result. The terms "TEXT", "BORD" and "PICT" denote text block, border block and photo block, respectively.

As can be seen in the table, the total block number of the image 200A or 200C is 8034. The numbers of the text, border and photo blocks of the photo and text separation result which match those of the standard block attribute file are 3518, 686 and 3131, respectively. That is, the total matched block number is 7335 (=3518+686+3131). Moreover, the overall correct ratio is 91.3% (=43.8%+8.5%+39%).

As for the text blocks, the numbers of the text, border and photo blocks included in the standard block attribute file are 3518, 143 and 274, respectively. The number of the matched text block is 3518, which corresponds to 43.8% of the total block number (i.e. 3518+143+274=3935). That is, the identification performance of the text block is 43.8%. In addition, 143 text blocks included in the standard block attribute file are recognized as border blocks, which correspond to 1.8% of the total block number. Moreover, 274 text blocks included in the standard block attribute file are recognized as photo blocks, which correspond to 3.4% of the total block number.

As for the border blocks, the numbers of the text, border and photo blocks included in the standard block attribute file are 41, 686 and 202, respectively. The number of the matched border block is 686, which corresponds to 8.5% of the total block number (i.e. 41+686+202=929). That is, the identification performance of the border block is 8.5%. In addition, 41 border blocks included in the standard block attribute file are recognized as border blocks, which correspond to 0.5% of the total block number. Moreover, 202 border blocks included in the standard block attribute file are recognized as photo blocks, which correspond to 2.5% of the total block number.

As for the photo blocks, the numbers of the text, border and photo blocks included in the standard block attribute file are 1, 38 and 3131, respectively. The number of the matched photo block is 3131, which corresponds to 39.0% of the total block number (i.e. 1+38+3131=3170). That is, the identification performance of the photo block is 39.0%. In addition, 1 photo block included in the standard block attribute file is recognized as a text block, which corresponds to 0.03% of the total block number. Moreover, 38 photo blocks included in the standard block attribute file are recognized as boarder blocks, which correspond to 0.5% of the total block number.

The photo and text separation performance table 300 illustrates the correct ratio by using the selected photo/text separation algorithm and the selected photo and text separation parameters. If the calculated correct ratio is not satisfied, another photo and text separation algorithm and/or another set of photo and text separation parameters may be selected and the step (B) is repeated until the correct ratio of the photo and text separation result is acceptable, e.g. greater than 95%.

Hereinafter, a flowchart of a method for calculating the photo and text separation performance will be illustrated as follows.

Figure 6:
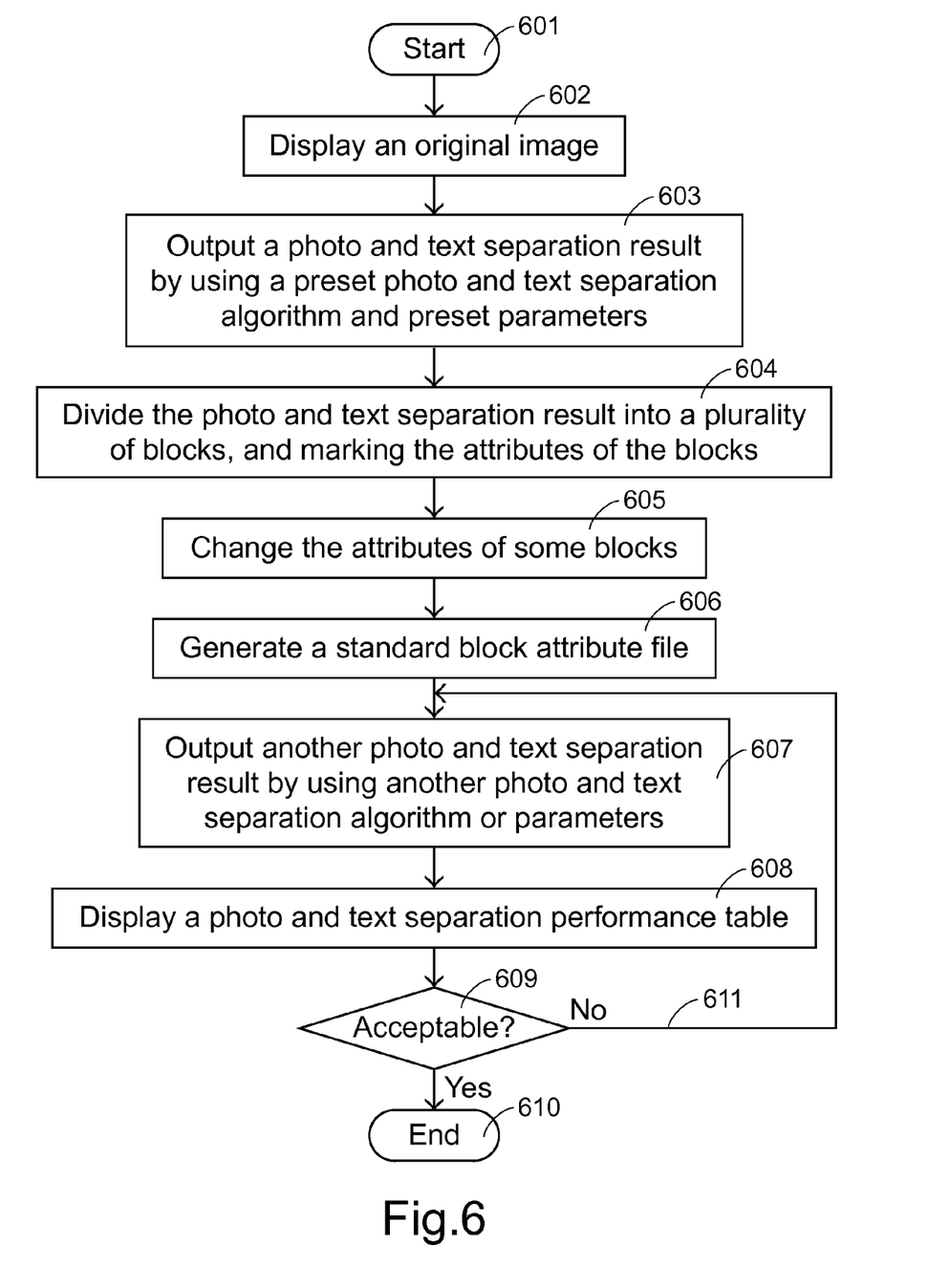
FIG. 6 is a flowchart of a method for calculating the photo and text separation performance according to the present invention.

After the method is started (Step 601), an original image is shown (Step 602). Then, a preset photo/text separation algorithm and photo/text separation parameters are utilized to process the original image, thereby outputting a photo and text separation result (Step 603). Then, the photo and text separation result is divided into a plurality of blocks, and these blocks are classified as text, border and photo blocks according to their attributes (Step 604). After "X" symbols are marked on some blocks which are required to be changed, the marked blocks are adjusted to have the desired attributes (Step 605). Then, a standard block attribute file including the changed attributes of the blocks is generated (Step 606). Then, a selected photo/text separation algorithm and selected photo/text separation parameters are utilized to process the original image (Step 607), thereby obtaining a photo and text separation performance table (Step 608). If the correct ratio shown in the photo and text separation performance table is acceptable (Step 609), the flowchart is ended (Step 610). Otherwise, if the correct ratio is not acceptable, another photo/text separation algorithm and/or another set of photo/text separation parameters may be selected and the steps 607, 608 and 609 are repeated until the correct ratio of the photo and text separation result is acceptable (Step 611).

From the above description, the method for calculating photo and text separation performance according to the present invention enables the examiner to realize the correct ratio of each adjusted photo and text separation result because a desired photo and text separation result has been previously stored as a standard block attribute file. In addition, the method of the present invention may be utilized as a common criterion for determining the photo/text separation result. Depending on the examiners' evaluation, the contents of the standard block attribute files may be varied. If one of the standard block attribute files is selected as a model file, the photo and text separation performance can be evaluated in an objective manner. In comparison with the conventional manual evaluation of marking the erroneous photo and text separation blocks with the naked eyes, the method of the present invention provides enhanced photo and text separation performance.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for calculating photo and text separation performance to evaluate the performance of a photo and text separation result by performing a photo and text separation on an original image and using a photo and text separation algorithm, said method comprising steps of:

(A) generating a standard block attribute file, wherein the step of generating said standard block attribute file includes the sub-steps of:

(A1) displaying said original image on a monitor;

(A2) performing said photo and text separation on said original image by using said photo and text separation algorithm, thereby outputting said photo and text separation result;

(A3) dividing said photo and text separation result into a plurality of blocks, and marking each block with an attribute symbol designating each block as a text block, a photo block or a border block according to the attributes thereof;
(A4) changing the attributes of some blocks by an examiner; and
(A5) generating said standard block attribute file;
(B) comparing said photo and text separation result with said standard block attribute file so as to display a photo and text separation performance table; and
(C) wherein said photo and text separation performance table includes data associated with text block identification performance, picture block identification performance, border block identification performance and correct ratio.

2. The method for calculating photo and text separation performance according to claim 1 wherein said blocks are marked by different colors depending on the attributes thereof.

3. The method for calculating photo and text separation performing according to claim 1 wherein said data associated with text block identification performance include the numbers of correctly identified text blocks and erroneously identified text blocks, said data associated with photo block identification performance include the numbers of correctly identified photo blocks and erroneously identified photo blocks, and said data associated with border block identification performance include the numbers of correctly identified border blocks and erroneously identified border blocks.

4. A method for adjusting photo and text separation performance, said method comprising steps of:
(A) performing a photo and text separation on an original image by using a photo and text separation algorithm and a photo and text separation parameter, thereby outputting a first photo and text separation result;
(B) comparing said first photo and text separation result with a standard block attribute file, thereby generating a photo and text separation performance table wherein said photo and text separation performance table includes data associated with text block identification performance, picture block identification performance, border block identification performance and correct ratio; and
(C) determining whether or not said correct ratio was produced and if said correct ratio was not produced then another photo and text separation algorithm and/or another set of photo/text separation parameters may be selected to perform another photo and text separation on said original image to get another photo and text separation result and;
(D) repeating said steps until said result of the photo and text separation is acceptable.

5. The method for adjusting photo and text separation performance according to claim 4 wherein the step of generating said standard block attribute file includes the sub-steps of:
displaying said original image;
performing said photo and text generation on said original image by using said photo and text generation algorithm, thereby outputting a photo and text separation result;
dividing said photo and text separation result into a plurality of blocks, and marking each block as a text block, a photo block or a border block according to the attribute thereof;
changing the attributes of some blocks by an examiner; and
generating said standard block attribute file.

6. The method for adjusting photo and text separation performance according to claim 5 wherein said blocks are marked by different colors depending on the attributes thereof.

7. The method for adjusting photo and text separation performance according to claim 4 wherein said data associated with text block identification performance include the numbers of correctly identified text blocks and erroneously identified text blocks, said data associated with photo block identification performance include the numbers of correctly identified photo blocks and erroneously identified photo blocks, and said data associated with border block identification performance include the numbers of correctly identified border blocks and erroneously identified border blocks.

* * * * *